United States Patent Office 3,445,534
Patented May 20, 1969

3,445,534
ETHYNYLATING AGENT AND PREPARATION THEREOF
Ricardo O. Bach and Conrad W. Kamienski, Gastonia, Matthew Henry Dellinger, Cherryville, Luther C. Mitchem, Lowell, and Robert C. Morrison, Gastonia, N.C., assignors to Lithium Corporation of America, Inc., New York, N.Y., a corporation of Minnesota
No Drawing. Filed Sept. 6, 1966, Ser. No. 577,161
Int. Cl. C07c 11/26
U.S. Cl. 260—665                                5 Claims

ABSTRACT OF THE DISCLOSURE

An improved ethynylation agent, for the ethynylation of aldehydes and ketones, in the form of a solution comprising the reaction product of acetylene with a suspension of lithium carbide in liquid ammonia.

---

This invention relates to a new and improved ethynylating agent and to the use thereof in ethynylating reactions.

When ammonia is evaporated from solutions of lithium acetylide in liquid ammonia, the lithium acetylide, as is well known, becomes unstable and is converted to a product consisting mainly of lithium carbide ($Li_2C_2$). Lithium carbide is also known to be produced by fusion of lithium and carbon at 800 to 900° C. Lithium carbide when prepared by either of the foregoing procedures, or by various other procedures as well, is not soluble in liquid ammonia.

We have found, surprisingly, however, that when lithium carbide, prepared, for instance, by either of the foregoing procedures, is suspended in finely ground or finely divided form in liquid ammonia, and acetylene gas is passed into said suspension, the lithium carbide quite rapidly goes into solution. It has also been found that the resulting solution is a highly effective ethynylating agent, particularly for ethynylating aldehydes and ketones such as benzaldehyde, acetaldehyde, propionaldehyde, n-butyraldehyde, isobutyraldehyde, crotonaldehyde, α-ethylcrotonaldehyde, phenylacetaldehyde; acetone, diethylketone, cyclohexanone, acetophenone, methyl ethyl ketone, benzophenone, and base-sensitive x-β-unsaturated ketones such as β-chlorovinyl ethyl ketone, mesityl oxide, benzalacetone, and β-ionone to their respective ethynyl carbinols. The ethynylating agents produced in accordance with the present invention, generally speaking, have been found to produce yields of ethynyl carbinols substantially greater than those obtained employing ordinary ethynylating solutions prepared from lithium metal and acetylene in liquid ammonia. Thus, by way of illustration, a yield of 97.5% of 5-chloro-3-hydroxy-3-ethyl-penten-4-yne was obtained on reaction of β-chlorovinyl ethyl ketone utilizing the ethynylating agent or solution of the present invention, whereas a yield of only 87.5% was obtained using a conventional ethynylating agent or solution made by adding acetylene to a solution of lithium metal in liquid ammonia.

Over and above the foregoing advantages of the ethynylating agent of the present invention over the aforementioned conventional ethynylating agent, there are further advantages. Thus, the production of the aforesaid conventional ethynylating agent involves quite long reaction times due to the occurrence of side reactions which consume acetylene. Thus, as acetylene is passed into a solution of lithium metal in liquid ammonia, some of the hydrogen which is evolved due to a metalation of the acetylene reduces part of the acetylene to ethylene. Hence, it is necessary so to control the reaction that no excess of acetylene is present over that which is rapidly metalated by the lithium metal. This requires a regulated slow feed of acetylene, leading to extended reaction times and lower recoveries of product per unit time, very important factors to industrial users of this procedure. However, in accordance with the present invention, lithium carbide reacts almost instantaneously and completely with acetylene without any concomitant side reactions such as reduction of acetylene, and thus larger batches utilizing the new ethynylating agent may be run in the same period of time now necessary for batch runs involving the conventional ethynylating solutions, leading to a considerable saving for the user. This saving in time is still further enhanced by certain other factors associated with the present new ethynylating agent. The first of these factors is that, in the production of the ethynylating agent of the present invention, only about one-half as much acetylene is required in relation to the amount of acetylene required in the production of an equivalent amount of the aforesaid conventional ethynylating agent. In this connection, should be noted that, whereas hydrogen is evolved in the production of the aforesaid conventional ethynylating agent, in the production of the ethynylating agent of the present invention no hydrogen is evolved, thereby avoiding side reductions of acetylene and also avoiding the problem of disposing of dangerous hydrogen gas. In the production of the conventional ethynylating agent, what amounts to a two-step operation is required, namely, first dissolving lithium metal in liquid ammonia, a step which requires some period of time, and then reacting the dissolved lithium with acetylene; whereas, in the production of the ethynylating agent of the present invention, the reaction of acetylene with the dispersion of the lithium carbide in liquid ammonia is an operation in which dissolution of the lithium carbide and reaction with the acetylene occur essentially simultaneously in what amounts to a one-step operation and proceeds exceedingly rapidly. A still further advantage in the manner of use of lithium carbide pursuant to the present invention is that an excess of it can effectively be used (over that necessary to produce a saturated solution of the ethynylating agent) to effect the ethynylation of aldehydes and ketones, enabling its use in concentrations higher than those possible with lithium acetylide made in liquid ammonia from lithium metal and acetylene. Besides this, it has been discovered that the aldehydes and ketones can be reacted with lithium carbide and acetylene essentially in one operation. Thus, for example, a ketone or a solution of it in an inert medium can be added to a suspension of lithium carbide in liquid ammonia while a stream of acetylene gas is passed into the mixture, producing, on workup, the corresponding ethynyl carbinol in good yield. The advantage of the use of such an excess of lithium carbide is in the greater yield of ethynyl carbinol which can be realized per unit of reaction volume.

In carrying out the production of the ethynylating agent of the present invention, the lithium carbide should be in finely divided form. It is particularly desirable that the average particle size be below 600 microns and, better still, below 150 microns, and especially from 2 to 20 microns. It is quite satisfactory to employ ball milled lithium carbide although other grinding or subdividing techniques can be utilized. Since lithium carbide is reactive, particularly in moist air, it is desirable that its handling and grinding be done in an essentially moisture-free air and, better still, under an atmosphere of an inert gas such as argon, helium or the like.

In the reaction between the suspension of lithium carbide in liquid ammonia and the acetylene, the molar ratio of the acetylene to the lithium carbide is generally approximately 1:1, particularly where the lithium carbide is in very finely divided form, for instance, 100 microns or less. Where the lithium carbide is in somewhat coarser form, it is usually advantageous, in order to bring about speedy dissolution of the lithium carbide, to employ an excess of acetylene. Thus, for example, if the lithium carbide particle size is of the order of about 1,000 microns, an excess of 80% more or less should be used, i.e., a molar ratio of acetylene to lithium carbide of 1.8:1. Hence, in most cases, the molar ratio of the acetylene to the lithium carbide will be in the range of 1:1 to 1.8:1.

The upper limit of solubility of the ethynylating agent is very close to 1.1 moles per liter of solution. The amount of liquid ammonia required to dissolve the ethynylating agent derived from 100 grams of lithium carbide at $-33°$ C. is 3,300 grams. Often the concentration of ethynylating agent employed is lower than 1.1 moles per liter of solution, with a practical lower limit generally being about 0.5 mole per liter of solution. The amount of liquid ammonia needed to yield a reagent of this concentration (at $-33°$ C.) from 100 grams of lithium carbide is 7,100 grams. However, as indicated above, the upper limit of solubility of the ethynylating agent is no bar to the use of added or excess amounts of lithium carbide, over and above that needed to produce saturated solutions of the ethynylating agent, which mixtures on reaction with acetylene in the presence of the aforementioned aldehydes and ketones also produce the corresponding ethynyl carbinols in enhanced yield.

The temperature at which the process of producing the ethynylating agent is carried out is somewhat variable but, in general, it is at or below the boiling point of liquid ammonia, which is about $-33°$ C., at atmospheric pressure. At superatmospheric pressures, higher temperatures can be employed, for instance, up to $+25°$ C. or higher, depending upon the pressure; and lower temperatures can be used, if desired, as, for instance, down to $-80°$ C. or even lower. The foregoing situation is particularly applicable where no extraneous diluents are utilized, and none is needed for very satisfactorily carrying out the process.

In certain instances, it may be preferable to utilize an added diluent which is inert to the reactants and the ethynylating agent. Thus, for instance, inert alkyl ethers or alkyl amines can be used to raise the boiling point of the reaction mixture, when so desired, either during or after completion of the preparation of the ethynylating agent. The increase in the boiling point of the reaction mixture so achieved is helpful in accelerating reactions between the ethynylating reagent and certain other reactants such as particular ketones and alkyl halides, by allowing these reactions to be conducted at higher temperatures. Furthermore, if the lithium carbide is used in the form of a dispersion in an oil or other hydrocarbon medium (not normally miscible with liquid ammonia) in the preparation of the ethynylating agent, an added diluent miscible with both the hydrocarbon and liquid ammonia may be advantageously added to the reaction medium to allow for improved contact and, thus, yield a more rapid reaction between the lithium carbide and the acetylene. The oil or other hydrocarbon slurry of lithium carbide is a satisfactory form of the ethynylating agent.

The following examples are illustrative of the practice of the present invention. It will be understood that various changes can be made in the light of the guiding principles and teachings disclosed herein and, therefore, they are not to be construed as limitative of the scope of the invention as pointed out in the appended claims.

Example 1.—Preparation of ethynylating agent 7.6 grams (0.202 mole) of finely ground $Li_2C_2$ (assaying 99.68% $Li_2C_2$) was placed in a 3-necked flask equipped with a Dry Ice condenser, low temperature thermometer, gas inlet tube, and stirrer. 500 cc. of ammonia was condensed into the flask and acetylene (0.202 mole), pre-treated by passage over activated carbon, was bubbled into the stirred suspension at a rate of 130 cc. per minute over a period of 10 minutes. After this time no further solid material was noticeable in the flask and a filtered sample of the solution showed the presence of 0.4 g. atom of lithium.

Example 2.—Preparation of 5-chloro-3-hydroxy-3-ethyl-penten-4-yne

To the solution of Example 1 there was added, during a period of 30 minutes, a solution of 53.1 g. (0.45 mole) of β-chlorovinyl ethyl ketone in 50 ml. of dry ethyl ether. After addition of 200 cc. of dry ethyl ether, the ammonia was allowed to evaporate and the resultant reaction mixture decomposed with a mixture of ice and glacial acetic acid. The ether layer was found to contain 56.3 g. of 5-chloro-3-hydroxy-3-ethyl-penten-4-yne (97.5% yield based on $Li_2C_2$) by gas-liquid chromatography. The product was worked up (after treatment with a mixture of ice and glacial acetic acid) as follows: The ether layer was washed twice each with 5% $NaHCO_3$ and saturated $NaHSO_3$ solutions and then with water. After drying over $MgSO_4$, the ether layer was distilled at atmospheric pressure to remove most of the ethyl ether. The residue was stripped of remaining ether under vacuum and then fractionated. The desired product distilled over at 56 degrees C. and 1 mm. pressure (literature B.P. 28.5–30 degrees C. at 0.1 mm.). Infra-red examination showed typical bands for OH (2.8–3.1 microns), —C≡C—H (3.0–3.1 microns; 4.7 microns), with no band appearing at 5.6–6.1 microns (carbonyl).

Example 3.—Preparation of 5-(2,6,6-trimethyl-1-cyclohexene-1-yl)-3-methyl-4-penten-1-yn-3-ol To a 1 liter, 3-necked flask, equipped with a mechanical stirrer, Dry Ice condenser (outlet protected by an argon gas by-pass), low temperature thermometer, and gas inlet tube, was added 6.55 grams (0.174 mole) of ball milled lithium carbide ($Li_2C_2$) and 500 milliliters of dry liquid ammonia. Acetylene gas (pre-treated to remove acetone by passage over activated carbon) was bubbled into the stirred mixture for 30 minutes at a flow rate of 400 cc. per minute. The solution was allowed to stir for an additional 30 minutes. The clear solution was found to contain 0.325 gram atom of lithium. 65 ml. (61.3 g., 0.32 mole) of β-ionone in 50 ml. of dry ethyl ether was added dropwise to said solution, with stirring, over a period of 30 to 35 minutes. The solution turned a yellow color during this addition. 200 ml. of dry ethyl ether was then added and the ammonia allowed to evaporate overnight with stirring. The residual suspension was treated with 18.2 grams (0.344 mole) of $NH_4Cl$ followed by 250 ml. of water. After stirring for 30 minutes, the aqueous layer was separated and washed once with 75 ml. of ether. The combined ether extracts were washed once with 200 ml. of water and then dried over 50 grams of anhydrous $K_2CO_3$. The ether solution was found to contain only the desired product (infra-red identification) and unreacted β-ionone. The percent conversion based on unreacted β-ionone was found to be 60% as determined by gas-liquid chromatography. The yield of 5-(2,6,6-trimethyl-1-cyclohexene-1-yl)-3-methyl-4-penten-1-yn-3-ol (as determined by a known titrimetric procedure involving reaction of a weighed sample of the product with excess alcoholic $AgNO_3$, followed by titration of the liberated acid with standard aqueous alkali) was 57.5%.

To isolate the product, the solvent was removed under reduced pressure, 150 ml. of methanol, 15 g. of semicarbazide (hydrochloride salt), and 21 g. of NaOAc was added to the residue and the solution heated to 50 degrees C. in a water bath, allowed to cool slowly and to stand at room temperature for 2–3 hours. The solution was poured into a large excess of water and the mixture extracted with 700 cc. of pentane. After filtration, the pentane extract was dried over anhydrous $K_2CO_3$ in the refrigerator at 5 degrees C. overnight. After filtration of the resulting slurry, the filtrate was concentrated under vacuum and the viscous yellow residue fractionated. The product distilled at 98 degrees and 3 mm. pressure (lit. B.P. 59 degrees C. at 0.5 mm.). Infra-red examination showed the product to be the desired ethynyl carbinol (bands at 3.0–3.1 microns, 4.7 microns) (—CH≡C—) and 2.8–3.1 microns (OH) (no ketone band at 5.6–6.1 microns).

Example 4.—Preparation of 5-phenyl-3-methyl-4-penten-1-yn-3-ol 3.3 grams (0.087 mole) of micro-ground lithium carbide ($Li_2C_2$) and 150 cc. of dry liquid ammonia were placed in a 500 cc. round-bottom flask equipped with Dry Ice condenser, low temperature thermometer, mechanical stirrer, gas inlet tube and 100 cc. graduated dropping funnel. Acetylene gas (pre-heated to remove acetone by passage over activated carbon) was bubbled into the stirred mixture for 15 minutes at a flow rate of 130 cc./minute. After stirring for a further period of 30 minutes, the solution was found to contain 0.134 gram atom of dissolved lithium. 20.8 g. (0.14 mole) of benzalacetone in 50 cc. of dry ethyl ether was added to the stirred solution over a 15 minute period. After addition of 100 cc. of dry ethyl ether the resulting clear, yellow solution was stirred under reflux for an additional 2 to 3 hours and then further until the ammonia had evaporated. 8.1 g. (0.15 mole) of $NH_4Cl$ was then added to the reaction mixture followed by 100 cc. of water. After stirring for a few minutes, the layers were separated and the ether layer dried over anhydrous $K_2CO_3$. The ether solution was found to contain the desired product (infra-red identification and M.P. 50–51 degrees C.) and unreacted benzalacetone. The percent conversion based on unreacted benzalacetone was found to be 88% as determined by gas-liquid chromatography. The yield of 5-phenyl-3-methyl-4-penten-1-yn-3-ol, as determined by titration, as in Example 3, was 74%. The product was sublimed at 3 mm. and 100 degrees C. and the sublimate found to melt at 47–52 degrees C. (literature M.P. 50–50.5 degrees C.); IR bands at 2.8–3.1 microns (OH group) and 4.7 microns (—C≡C—H); no band at 5.6–6.1 microns (carbonyl).

Example 5.—Preparation of 3,5-dimethyl-4-hexen-1-yn-3-ol 8.8 g. (0.232 mole) of ball milled lithium carbide ($Li_2C_2$) and 500 cc. of dry liquid ammonia were placed in a 1 liter, 3-necked, round bottom flask equipped with mechanical stirrer, Dry-Ice condenser, low temperature thermometer, gas inlet tube, and 100 cc. graduated dropping funnel. Acetylene (pre-treated to remove acetone by passage over activated carbon) was passed into the stirred mixture for a period of 40 minutes at a flow rate of 400 cc./minute. After stirring the mixture for an additional 30 minutes, the solution was found to contain 0.46 gram atom of dissolved lithium. 42.7 g. (0.435 mole) mesityl oxide in 50 cc. of dry ethyl ether was added to the stirred mixture over a period of 15 to 20 minutes. 200 cc. of dry ethyl ether was added to the clear yellow solution and the ammonia allowed to evaporate from the stirred mixture. 23 g. (0.435 mole) of $NH_4Cl$ and 250 cc. of water were added to the mixture. After stirring for 15 minutes, the aqueous layer was separated and washed with 200 cc. of water. The combined ether extracts were dried over anhydrous $K_2CO_3$ and the ether evaporated off under reduced pressure. The residue was found by gas-liquid chromatography to contain unreacted mesityl oxide and two main products containing acetylenic and hydroxyl groups. The yield of product, determined by titration as in Example 4, was 24%. To isolate the product, the solvent was removed at reduced pressure and the residue fractionated. The product distilled finally at 72 degrees C. at 26 mm. (literature—73–74 degrees C. at 26 mm.). Infra-red bands at 2.8–3.1 microns (OH), 4.7 (—C≡C—H). The product still contained unreacted ketone (IR band at 6.0 microns).

Example 6.—Preparation of 5-chloro-3-hydroxy-3-ethyl-penten-4-yne 49 grams (0.13 mole) of finely ground $Li_2C_2$ (assaying 99.68% $Li_2C_2$) was placed in a 3-necked flask equipped as in Example 1. 250 cc. of ammonia was condensed into the flask and acetylene (0.13 mole), pre-treated by passage over activated carbon, was bubbled into the stirred suspension at a rate of 130 cc. per minute until a saturated solution of the ethynylating reagent (1.04 moles per liter) was obtained as indicated by electrical conductivity measurement. An additional 4.9 grams of $Li_2C_2$ was then carefully added to the flask. A solution of 61 grams (0.52 mole) of β-chlorovinyl ethyl ketone in 57 ml. of dry ethyl ether was added to the mixture, with concomitant passage of acetylene through it at a flow rate of 130 cc. per minute, during a period of 32 minutes. After addition of 100 cc. of dry ethyl ether, the ammonia was allowed to evaporate and the resultant mixture treated further as described in Example 1. The ether layer was found to contain a substantially quantitative yield of 5-chloro-3-hydroxy-3-ethyl-penten-4-yne.

What is claimed is:

1. A process of producing a solution of an ethynylating agent which comprises adding acetylene to a suspension of finely divided lithium carbide in liquid ammonia.

2. A process according to claim 1, in which the molar ratio of the acetylene to the lithium carbide is in the range of 1:1 to 1.8:1.

3. A process according to claim 2, in which the reaction temperature is in the range of —33° C. to —80° C.

4. A process according to claim 3, in which the acetylene is added in the form of a gas which is bubbled through the reaction mixture.

5. An ethynylating agent in the form of a solution comprising the reaction product of acetylene with a suspension of lithium carbide in liquid ammonia.

References Cited

UNITED STATES PATENTS 2,125,384   8/1938   Macallum _____ 260—156

OTHER REFERENCES

Oroshnik et al., J. Am. Chem. Soc. 71 (1949) p. 2062–5.

TOBIAS E. LEVOW, Primary Examiner.

A. P. DEMERS, Assistant Examiner.

U.S. Cl. X.R.

23—208; 260—617, 618, 633, 638